(12) United States Patent
Nakai et al.

(10) Patent No.: US 9,390,347 B2
(45) Date of Patent: Jul. 12, 2016

(54) RECOGNITION DEVICE, METHOD, AND COMPUTER PROGRAM PRODUCT

(71) Applicant: KABUSHIKI KAISHA TOSHIBA, Minato-ku, Tokyo (JP)

(72) Inventors: Tomohiro Nakai, Kanagawa (JP); Susumu Kubota, Tokyo (JP); Satoshi Ito, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 173 days.

(21) Appl. No.: 14/132,371

(22) Filed: Dec. 18, 2013

(65) Prior Publication Data

US 2014/0177950 A1      Jun. 26, 2014

(30) Foreign Application Priority Data

Dec. 20, 2012   (JP) .................................. 2012-277935

(51) Int. Cl.
*G06K 9/62* (2006.01)
(52) U.S. Cl.
CPC ...................................... *G06K 9/627* (2013.01)
(58) Field of Classification Search
None
See application file for complete search history.

(56) References Cited

U.S. PATENT DOCUMENTS

| 8,014,973 B1* | 9/2011 | Huang ........................... 702/180 |
| 2005/0180639 A1* | 8/2005 | Trifonov et al. .............. 382/225 |
| 2009/0003660 A1* | 1/2009 | Das .............................. 382/118 |

OTHER PUBLICATIONS

Boiman, Oren, Eli Shechtman, and Michal Irani. "In defense of nearest-neighbor based image classification." Computer Vision and Pattern Recognition, 2008. CVPR 2008. IEEE Conference on. IEEE, 2008. 8 pages.*
Lin, Shinfeng D., et al. "Trademark image retrieval by distance-angle pair-wise histogram." International Journal of Imaging Systems and Technology 15.2 (2005): 103-113. 11 pages.*
Iwanaga, Tatsuaki, et al. "A Modified Histogram Approach to Trademark Image Retrieval." IJCSNS International Journal of Computer Science and Network Security 11.4 (2011): 56-62. 7 pages.*
Cover et al., Nearest Neighbor Pattern Classification, IEEE Trans. Information Theory, vol. 13, No. 1, pp. 21-27, 1967.

* cited by examiner

*Primary Examiner* — Sumati Lefkowitz
*Assistant Examiner* — Ryan P Potts
(74) *Attorney, Agent, or Firm* — Amin, Turocy & Watson LLP

(57) ABSTRACT

A recognition device includes a storage unit, an acquiring unit, a first calculator, a second calculator, a determining unit, and an output unit. The storage unit stores multiple training patterns each belonging to any one of multiple categories. The acquiring unit acquires a recognition target pattern to be recognized. The first calculator calculates, for each of the categories, a distance histogram representing distribution of the number of training patterns belonging to the category with respect to distances between the recognition target pattern and the training patterns belonging to the category. The second calculator analyzes the distance histogram of each of the categories to calculate confidence of the category. The determining unit determines a category of the recognition target pattern from the multiple categories by using the confidences. The output unit outputs the category of the recognition target pattern.

12 Claims, 8 Drawing Sheets

RECOGNITION DEVICE, METHOD, AND COMPUTER PROGRAM PRODUCT

CROSS-REFERENCE TO RELATED APPLICATIONS

This application is based upon and claims the benefit of priority from Japanese Patent Application No. 2012-277935, filed on Dec. 20, 2012; the entire contents of which are incorporated herein by reference.

FIELD

Embodiments described herein relate generally to a recognition device, a method therefor and a computer program product.

BACKGROUND

A technique called k-nearest neighbor algorithm is known in the field of pattern recognition. The k-nearest neighbor algorithm is a technique for searching for k training patterns from multiple training patterns whose categories are known in ascending order of the distance in a feature space to a pattern to be recognized whose category is unknown, and estimating the category, to which the largest number of training patterns out of the searched k training patterns belong, to be the category of the pattern to be recognized.

With the technique of the related art as described above, however, since the pattern to be recognized is evaluated on the basis of the limited neighborhood number k of training patterns, the relation with the whole categories cannot be evaluated and correct recognition may be difficult. Furthermore, if there is an error in the training patterns, there is a concern about degradation in the robustness.

DETAILED DESCRIPTION

According to an embodiment, a recognition device includes a storage unit, an acquiring unit, a first calculator, a second calculator, a determining unit, and an output unit. The storage unit stores multiple training patterns each belonging to any one of multiple categories. The acquiring unit acquires a recognition target pattern to be recognized. The first calculator calculates, for each of the categories, a distance histogram representing distribution of the number of training patterns belonging to the category with respect to distances between the recognition target pattern and the training patterns belonging to the category. The second calculator analyzes the distance histogram of each of the categories to calculate confidence of the category. The determining unit determines a category of the recognition target pattern from the multiple categories by using the confidences. The output unit outputs the category of the recognition target pattern.

Embodiments will be described below in detail with reference to the accompanying drawings.

First Embodiment

Figure 1:
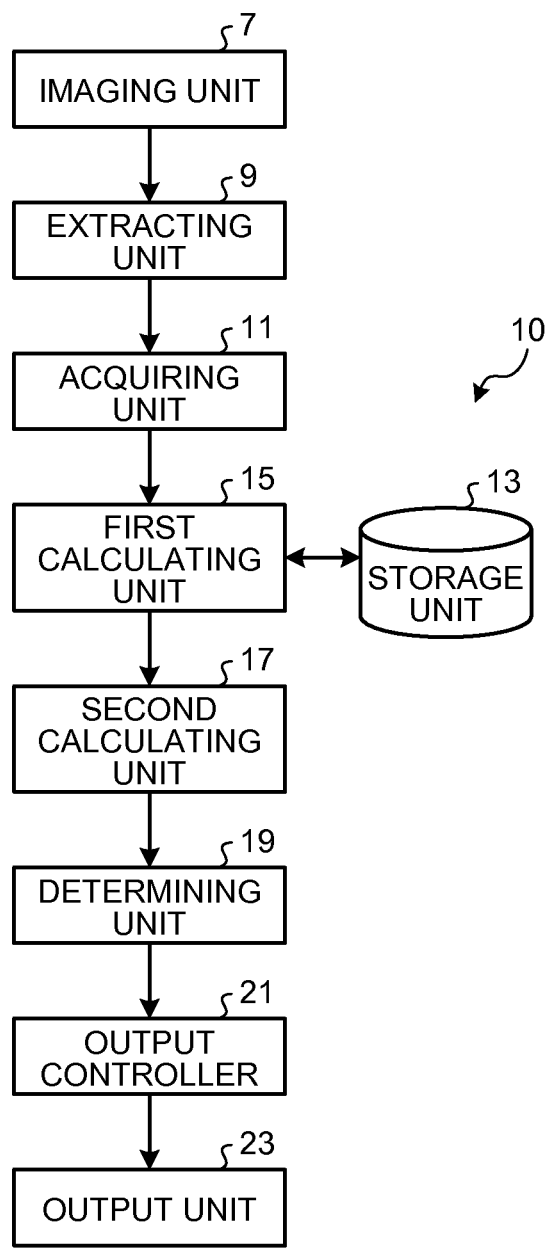
FIG. 1 is a configuration diagram illustrating an example of a recognition device according to a first embodiment.

FIG. 1 is a configuration diagram illustrating an example of a recognition device 10 according to a first embodiment. As illustrated in FIG. 1, the recognition device 10 includes an imaging unit 7, an extracting unit 9, an acquiring unit 11, a storage unit 13, a first calculating unit (first calculator) 15, a second calculating unit (second calculator) 17, a determining unit 19, an output controller 21, and an output unit 23.

The imaging unit 7 can be realized by an imager such as a digital camera, for example. The extracting unit 9, the acquiring unit 11, the first calculating unit 15, the second calculating unit 17, the determining unit 19, and the output controller 21 may be implemented by making a processor such as a central processing unit (CPU) execute programs, that is, by software, may be implemented by hardware such as an integrated circuit (IC), or may be implemented by combination of software and hardware, for example. The storage unit 13 can be realized by a storage device that can magnetically, optically or electrically store information such as a hard disk drive (HDD), a solid state drive (SSD), a memory card, an optical disk, a random access memory (RAM), or a read only memory (ROM), for example. The output unit 23 may be realized by a display device such as a liquid crystal display or a touch panel display, by an audio output device such as a speaker, or by a combination of the both.

The imaging unit 7 captures an object to be recognized to obtain an image. The extracting unit 9 extracts a recognition target pattern that is a pattern to be recognized from the image captured by the imaging unit 7.

The acquiring unit 11 acquires the recognition target pattern extracted from the extracting unit 9. A recognition target pattern in the first embodiment is a feature vector extracted from an image obtained by capturing an object to be recognized, and examples thereof include an image feature such as a HOG (histogram of oriented gradients).

Note that a recognition target pattern is not limited to a feature vector extracted from an image, and may be a feature vector extracted by any method from information acquired by any means such as a microphone or a sensor, for example.

The storage unit 13 stores multiple training patterns each belonging to any one of multiple categories. Note that the number of training patterns belonging to each category is assumed to be more than one but a case where the number is one is not excluded.

In the first embodiment, a training pattern is assumed to be a feature vector extracted from an image obtained by capturing an object, but is not limited thereto. A training pattern may be any information corresponding to a recognition target pattern.

Furthermore, a category refers to a type of object (training pattern) and an example thereof is specific information that an object (training pattern) originally and potentially has. For example, if an object is an apple, the training pattern (feature vector) based on the object belongs to the category "apple", and if an object is a pear, the training pattern (feature vector) based on the object belongs to the category "pear".

The first calculating unit 15 calculates, for each category, a distance histogram representing distribution of the number of training patterns belonging to the category with respect to the distances between the recognition target pattern acquired by the acquiring unit 11 and the training patterns belonging to the category.

Figure 2:
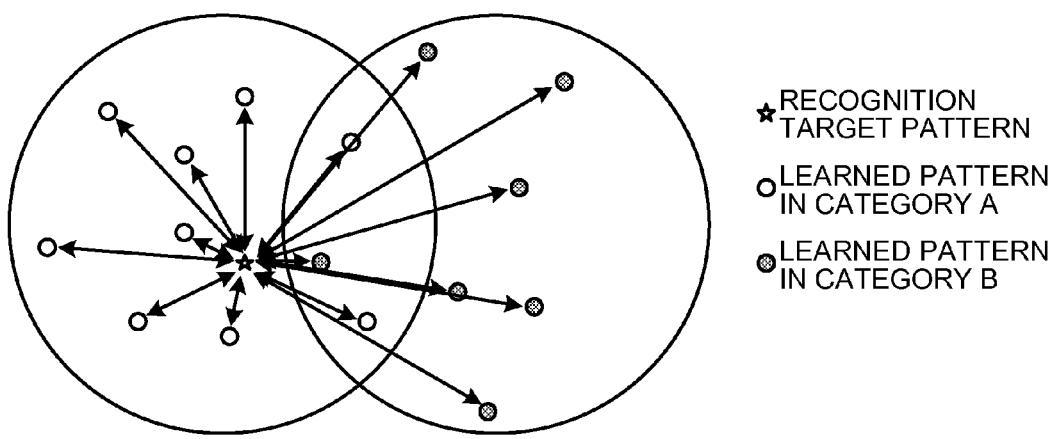
FIG. 2 is an explanatory diagram of an example of calculation of the distance between a pattern to be recognized and a training pattern according to the first embodiment.

Specifically, the first calculating unit 15 acquires multiple training patterns from the storage unit 13, and calculates the distance between each of the acquired multiple training patterns and the recognition target pattern acquired by the acquiring unit 11. For example, the first calculating unit 15 calculates the Euclidean distance between the recognition target pattern and a training pattern as illustrated in FIG. 2. In the example illustrated in FIG. 2, a Euclidean distance between the recognition target pattern and a training pattern is represented by an arrow.

Note that the distance between a recognition target pattern and a training pattern is not limited to a Euclidean distance, but may be any distance measure such as a Manhattan distance, a Mahalanobis distance, or a Hamming distance.

Figure 3:
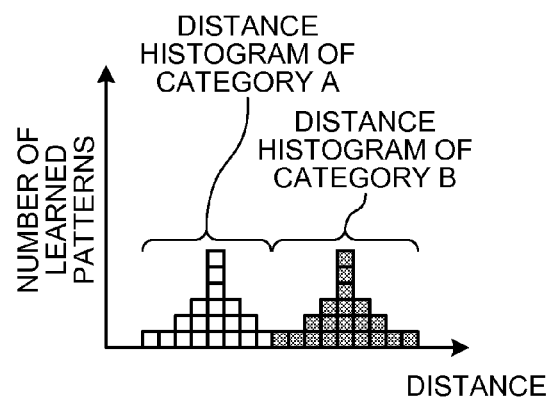
FIG. 3 is a graph illustrating an example of distance histograms according to the first embodiment.

The first calculating unit 15 then accumulates, for each of multiple categories, multiple training patterns belonging to the category according to the calculated distances to calculate distance histograms as illustrated in FIG. 3, for example. Alternatively, the first calculating unit 15 may calculate the distance histograms by accumulating, for each of distance interval, the number of training patterns whose calculated distances are within the distance interval instead of accumulating the training patterns according to the calculated distances.

Although training patterns belonging to a category A and training patterns belonging to a category B are illustrated as the training patterns in the example illustrated in FIGS. 2 and 3, the training patterns are not limited thereto and there are other training patterns in practice.

Furthermore, the first calculating unit 15 need not calculate (compare) the distances of all the training patterns stored in the storage unit 13 to the recognition target pattern, but may calculate only the distances of some of the training patterns stored in the storage unit 13 to the recognition target pattern. In this case, however, it is preferable to calculate the distances of training patterns whose distances to the recognition target pattern are estimated to be small, and exclude training patterns whose distances to the recognition target pattern are estimated to be large from calculation of distances.

The second calculating unit 17 analyzes the distance histogram of each of the categories to calculate the confidence of the category. Specifically, the second calculating unit 17 calculates the confidences of n ($1 \leq n \leq L$) categories with higher probabilities of being the category of the recognition target pattern out of the multiple categories.

In the first embodiment, the second calculating unit 17 calculates candidate categories at the first to n-th ranks from the distance histogram of each of the categories, and calculates n-th rank cumulative confidences representing the degrees of certainty that the correct category is included in the calculated first to n-th candidate categories.

A method for calculating the n-th rank cumulative confidences according to the first embodiment will be specifically described below. Herein, the number of categories of training patterns is represented by L, the maximum value of the distances between the recognition target pattern and training patterns stored in the storage unit 13 is represented by D, and the distance that is the mode (the distance with the largest number of training patterns) in the distance histogram of a category l ($1 \leq l \leq L$) is represented by $t_l$ ($0 \leq t_l \leq D$).

The second calculating unit 17 obtains, from the distance histogram of each of the categories, the distance $t_l$ that is the mode in the category. As a result, $\{t_1, \ldots, t_L\}$ is obtained.

Subsequently, the second calculating unit 17 arranges n of $\{t_1, \ldots, t_L\}$ in ascending order. The arrangement of n of $\{t_1, \ldots, t_L\}$ in ascending order is represented by $\{u_1, \ldots, u_n\}$. Categories $\{f_1, \ldots, f_n\}$ of $\{u_1, \ldots, u_n\}$ are the candidate categories at the first to n-th ranks.

The second calculating unit 17 then adds, to each of the n distances $\{u_1, \ldots, u_n\}$, the differences between adjacent distances from the shortest distance to the next largest distance after the present distance to calculate n confidences (n-th rank cumulative confidences) $\{g_1, \ldots, g_n\}$. The n-th rank cumulative confidences $\{g_1, \ldots, g_n\}$ each represent the degree of certainty that the correct category is included in the categories $\{f_1, \ldots f_n\}$. For example, the second calculating unit 17 applies the following equation (1) to each of n distances $\{u_1, \ldots u_n\}$ to calculate n confidences $\{g_1, \ldots g_n\}$:

$$g_n = u_{n+1} - u_1 \tag{1}$$

When n=L, however, the maximum value D of the distances is used for $u_{L+1}$.

The calculation of confidences is not limited to the above-described method, and may use any values calculated from distance histograms.

The determining unit 19 uses the confidences calculated by the second calculating unit 17 to determine the category of the recognition target pattern from the multiple categories. Specifically, the determining unit 19 uses any one of the n confidences calculated by the second calculating unit 17 to determine the category of the recognition target pattern from the n categories.

For example, the determining unit 19 determines whether or not the maximum confidence (first rank cumulative confidence) $g_1$ having the largest value of the n confidences $\{g_1, \ldots, g_n\}$ calculated by the second calculating unit 17 exceeds a threshold $R_{fix}$ (an example of a second threshold) and, if the maximum confidence $g_1$ exceeds the threshold $R_{fix}$, determines the category $f_1$ with the maximum confidence $g_1$ to be the category of the recognition target pattern.

If, for example, the maximum confidence $g_1$ does not exceed the threshold $R_{fix}$, the determining unit 19 determines whether or not a given confidence other than the maximum confidence of the n confidences $\{g_1, \ldots, g_n\}$ a threshold $R_{reject}$ (an example of a third threshold) and, if the given confidence exceeds the threshold $R_{reject}$, determines categories of confidences not lower than the given confidence out of the n confidences $\{g_1, \ldots g_n\}$ to be candidates for the category of the recognition target pattern. Note that $R_{reject} < R_{fix}$ is satisfied. For example, if the given confidence is the third rank cumulative confidence $g_3$ and exceeds the threshold $R_{reject}$, the categories $\{f_1, f_2, f_3\}$ of the first to third rank cumulative confidences $\{g_1, g_2, g_3\}$ are determined to be the candidates for the category of the recognition target pattern.

If, for example the given confidence does not exceed the threshold $R_{reject}$, the determining unit 19 determines that the category of the recognition target pattern is not present in the n categories.

Note that the method for determining the category of the recognition target pattern is not limited to the example described above, and may be a method of determining either one of two results which are determining the category with the maximum confidence to be the category of the recognition target pattern and determining that the category of the recognition target pattern does not exist, or may be a method of determining either one of two results which are determining categories with confidences not lower than a given confidence to be candidates for the category of the recognition target pattern and determining that the category of the recognition target pattern is not present, for example.

The output controller 21 causes the output unit 23 to output the category of the recognition target pattern determined by the determining unit 19.

Figure 4:
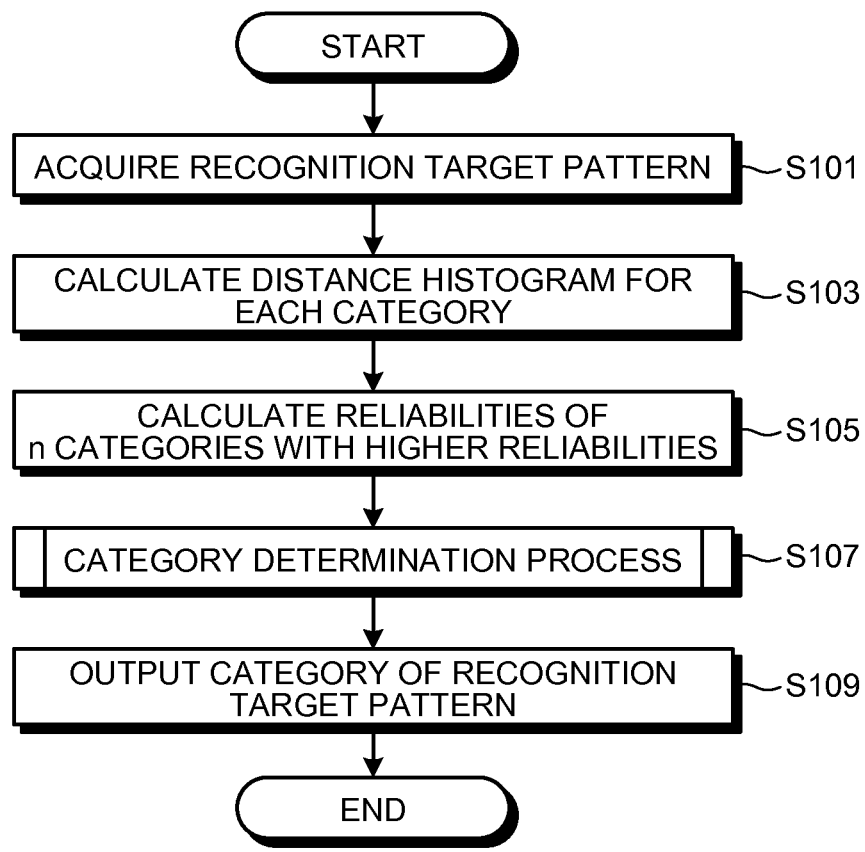
FIG. 4 is a flowchart illustrating an example of a recognition process according to the first embodiment.

FIG. 4 is a flowchart illustrating an example of a flow of procedures of a recognition process performed by the recognition device 10 according to the first embodiment.

First, the acquiring unit 11 acquires the recognition target pattern (step S101).

Subsequently, the first calculating unit 15 calculates, for each category, a distance histogram representing distribution of the number of training patterns belonging to the category with respect to the distances between the recognition target pattern acquired by the acquiring unit 11 and the training patterns belonging to the category (step S103).

Subsequently, the second calculating unit 17 analyzes the distance histogram of each of the categories to calculate the confidences of n categories with higher probabilities (confidences) of being the category of the recognition target pattern out of the multiple categories (step S105).

Subsequently, the determining unit 19 performs a category determination process of determining the category of the recognition target pattern from the n categories by using any one of the n confidences calculated by the second calculating unit 17 (step S107).

Subsequently, the output controller 21 causes the output unit 23 to output the category of the recognition target pattern determined by the determining unit 19 (step S109).

Figure 5:
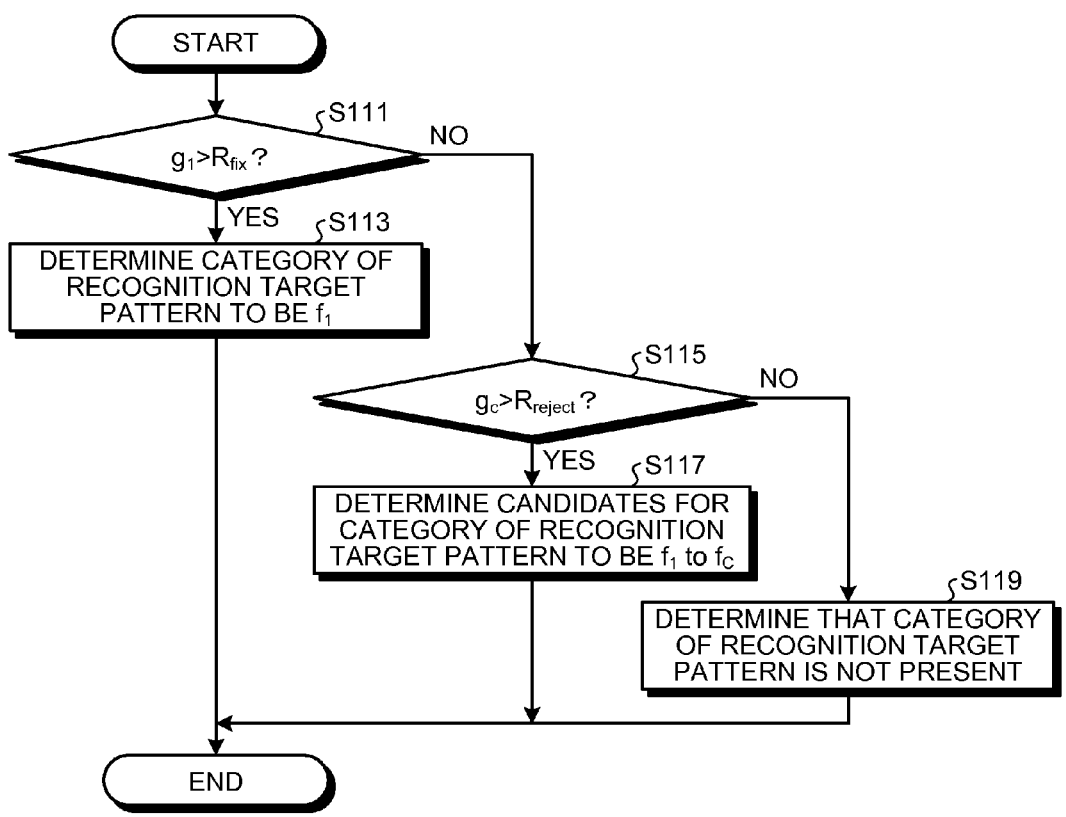
FIG. 5 is a flowchart illustrating an example of a category determination process according to the first embodiment.

FIG. 5 is a flowchart illustrating an example of a flow of procedures of the category determination process performed by the determining unit 19 according to the first embodiment.

First, the determining unit 19 determines whether or not the first rank cumulative confidence $g_1$ out of the n confidences $\{g_1, \ldots, g_n\}$ calculated by the second calculating unit 17 exceeds the threshold $R_{fix}$ (step S111) and, if the first rank cumulative confidence $g_1$ exceeds the threshold $R_{fix}$ (Yes in step S111), determines the category $f_1$ with the first rank cumulative confidence $g_1$ to be the category of the recognition target pattern (step S113).

If the first cumulative confidence $g_1$ does not exceed the threshold $R_{fix}$ (No in step S111), the determining unit 19 determines whether or not a C-th rank cumulative confidence $g_c$ other than the first rank cumulative confidence $g_1$ out of n confidences $\{g_1, \ldots, g_n\}$ exceeds the threshold $R_{reject}$ (step S115) and, if the C-th rank cumulative confidence $g_c$ exceeds the threshold $R_{reject}$ (Yes in step S115), determines the categories $\{f_1, \ldots f_c\}$ with the first to C-th cumulative confidences $\{g_1, \ldots g_c\}$ to be candidates for the recognition target pattern (step S117).

If the C-th rank cumulative confidence $g_c$ does not exceed the threshold $R_{reject}$ (No in step S115), the determining unit 19 determines that the category of the recognition target pattern is not present (step S119).

According to the first embodiment as described above, as a result of using a histogram of the distances between the recognition target pattern and the training patterns in each category, the relation between a recognition target pattern and the whole training patterns in each category can be evaluated and pattern recognition with higher recognition accuracy and robustness can be achieved.

Second Embodiment

In the second embodiment, an example in which confidences are calculated by using a cumulative histogram representing a ratio of the cumulative number obtained by adding up the numbers of training patterns at the respective distances of a distance histogram will be described. In the following, the difference from the first embodiment will be mainly described and components having similar functions as in the first embodiment will be designated by the same names and reference numerals as in the first embodiment, and the description thereof will not be repeated.

Figure 6:
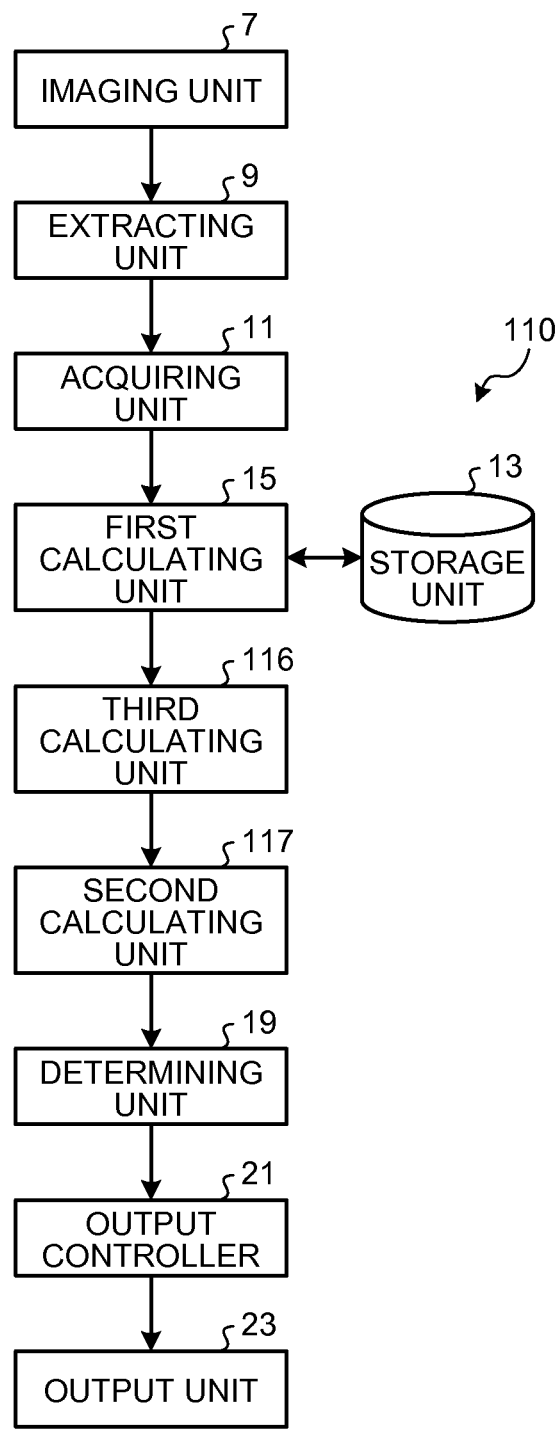
FIG. 6 is a configuration diagram illustrating an example of a recognition device according to a second embodiment.

FIG. 6 is a configuration diagram illustrating an example of a recognition device 110 according to the second embodiment. As illustrated in FIG. 6, the recognition device 110 of the second embodiment differs from that in the second embodiment in a third calculating unit 116 and a second calculating unit 117.

The third calculating unit 116 may be implemented by software, may be implemented by hardware, or may be implemented by combination of software and hardware, for example.

Figure 7:
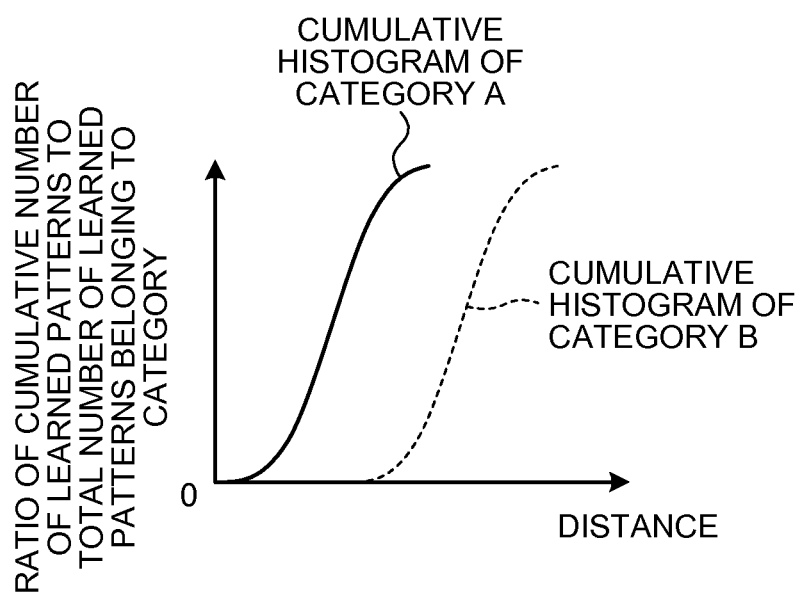
FIG. 7 is a graph illustrating an example of cumulative histograms according to the second embodiment.

The third calculating unit 116 calculates, for each category, a cumulative histogram representing the ratio of the cumulative number obtained by adding up the numbers of training patterns at the respective distances of the distance histogram calculated by the first calculating unit 15 according to the distances. Specifically, the third calculating unit 116 calculates, for each category, a cumulative histogram representing the ratio of the cumulative number obtained by adding up the numbers of training patterns at the respective distances of the distance histogram in ascending order of the distance to the total number of training patterns belonging to the category according to the distances as illustrated in FIG. 7.

The second calculating unit 117 further analyzes the cumulative histogram of each of the categories to calculate the confidence of the category.

In the second embodiment, the second calculating unit 117 calculates candidate categories at the first to n-th ranks from the distance histogram and the cumulative histogram of each of the categories, and calculates n-th rank cumulative confidences representing the degrees of certainty that the correct category is included in the calculated first to n-th candidate categories.

A method for calculating the n-th rank cumulative confidences according to the second embodiment will be specifically described below. Herein, the number of categories of training patterns is represented by L, the maximum value of the distances between the recognition target pattern and training patterns stored in the storage unit 13 is represented by D, the number of training patterns belonging to a category l ($1 \leq l \leq L$) is represented by $H_l$, and the number of training patterns at a distance t ($0 \leq t \leq D$) in the distance histogram of a category l is represented by $h_l(t)$.

The second calculating unit 117 calculates, for each category, weighted addition of the numbers of training patterns at the respective distances of the distance histogram in ascending order of the distance up to a distance $s_l$ at which the ratio of the cumulative histogram reaches a certain threshold T (an example of a first threshold) to obtain a weighted sum $d_l$. Note that $0 \leq T \leq 1$ is satisfied. For example, the second calculating unit 117 applies the following equation (2) to each of L categories to calculate L weighted sums $\{d_1, \ldots, d_L\}$:

$$d_1 = \frac{1}{H_1} \int_0^{s_1} w(t) h_1(t) dt \qquad (2)$$

In the equation, w(t) represents a weight on a distance t and the amount of information of a training pattern at a distance t from the recognition target pattern is used therefor, for example. When the recognition target pattern is assumed to be a model, this is a problem for obtaining a group of training pattern in which category fits the model. Since the degree of fitness of the model and training patterns can be deemed to be higher as the amount of information necessary for describing the group of training patterns is smaller, the amount of information is used for the weight. For example, w(t) can be expressed by the following equation (3):

$$w(t) = -\log P(t) \quad (3)$$

In the equation, P(t) represents the probability that the distance between the recognition target pattern and training patterns is t. Although the probability is used for the weight in the second embodiment, the weight is not limited thereto, and may be the distance itself or a value calculated by any method such as a value obtained by linear transformation of the distance.

Subsequently, the second calculating unit 117 arranges n of $\{d_1, \ldots, d_L\}$ in ascending order. The arrangement of n of $\{d_1, \ldots, d_L\}$ in ascending order is represented by $\{e_1, \ldots, e_n\}$. Categories $\{f_1, \ldots, f_n\}$ of $\{e_1, \ldots, e_n\}$ are the candidate categories at the first to n-th ranks.

The second calculating unit 117 then adds, to each of the n weighted sums $\{e_1, \ldots, e_n\}$, the differences between adjacent weighted sums from the smallest weighted sum to the next largest weighted sum after the present weighted sum to calculate n confidences (n-th rank cumulative confidences) $\{g'_1, \ldots, g'_n\}$. The n-th rank cumulative confidences $\{g'_1, \ldots, g'_n\}$ each represent the degree of certainty that the correct category is included in the categories $\{f_1, \ldots, f_n\}$. For example, the second calculating unit 117 applies the following equation (4) to each of n weighted sums $\{e_1, \ldots, e_n\}$ to calculate the n reliabilities $\{g'_1, \ldots, g'_n\}$:

$$g'_n = e_{n+1} - e_1 \quad (4)$$

When n=L, however, the value of the following equation (5) is used for $e_{L+1}$:

$$e_{L+1} = T \max w(t) \quad (5)$$

The calculation of confidences is not limited to the above-described method, and may use any values calculated from distance histograms and cumulative histograms. For example, the confidences may be calculated by using a distance at which the cumulative histogram reaches a threshold, differences of distances reaching a threshold and arranged in ascending order, or an average of distances reaching a threshold.

Figure 8:
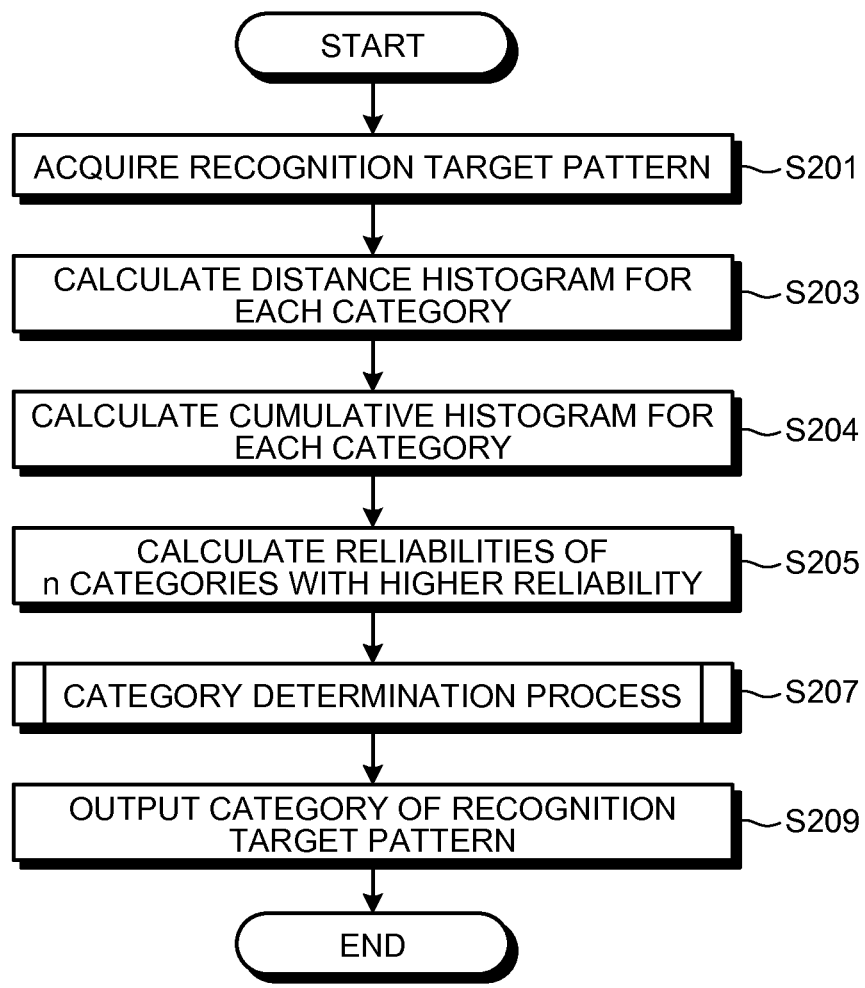
FIG. 8 is a flowchart illustrating an example of a recognition process according to the second embodiment.

FIG. 8 is a flowchart illustrating an example of a flow of procedures of a recognition process performed by the recognition device 110 according to the second embodiment.

First, processing in steps S201 to S203 is the same as that in steps S101 to S103 in the flowchart illustrated in FIG. 4.

Subsequently, the third calculating unit 116 calculates, for each category, a cumulative histogram representing the ratio of the cumulative number obtained by adding up the numbers of training patterns at the respective distances of the distance histogram calculated by the first calculating unit 15 according to the distances (step S204).

Subsequently, the second calculating unit 117 analyzes the distance histogram and the cumulative histogram of each of the categories to calculate the confidences of n categories with higher probabilities (confidences) of being the category of the recognition target pattern out of the multiple categories (step S205).

Subsequently, processing in steps S207 to S209 is the same as that in steps S107 to S109 in the flowchart illustrated in FIG. 4.

According to the second embodiment as described above, as a result of using a histogram of the distances between a recognition target pattern and training patterns and a cumulative histogram in each category, the relation between the recognition target pattern and the whole training patterns in each category can be evaluated and pattern recognition with higher recognition accuracy and robustness can be achieved.

Modified Example 1

Although examples in which the recognition target pattern and the training patterns are feature vectors extracted from images obtained by capturing objects to be recognized are described in the embodiments above, the patterns are not limited thereto and may be the images themselves obtained by capturing the objects to be recognized. In this case, the recognition device need not include the extracting unit 9 and the acquiring unit 11 may acquire an image captured by the imaging unit 7. Furthermore, the first calculating unit 15 may calculate a sum of distances between pixel values of respective pixels in the images, for example, as the distance between a recognition target pattern and a training pattern to calculate a distance histogram.

Modified Example 2

Although examples in which the recognition device includes the imaging unit 7 and the extracting unit 9 are described in the embodiments above, the recognition device need not includes these components. In this case, a recognition target pattern may be externally generated, and the acquiring unit 11 may acquire the recognition target pattern or the recognition target pattern may be stored in the storage unit 13 and then acquired by the acquiring unit 11.

Hardware Configuration

Figure 9:
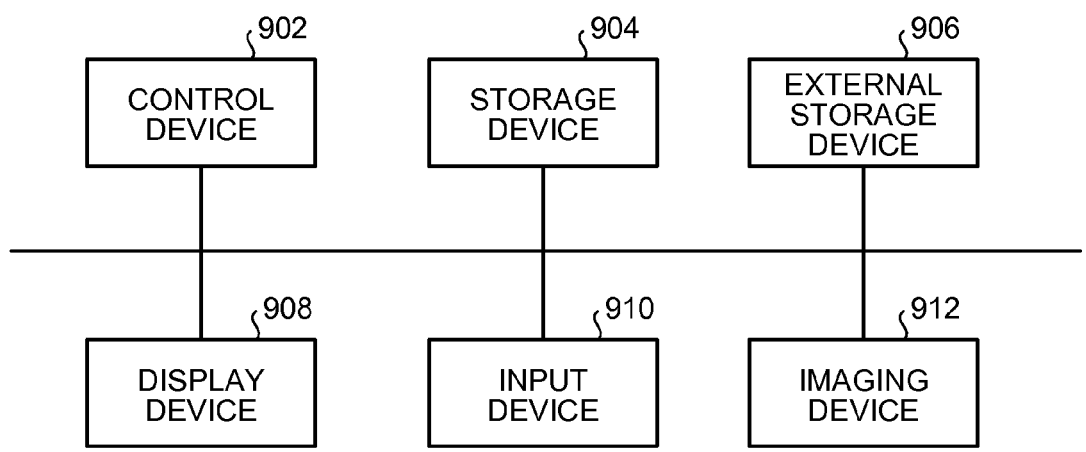
FIG. 9 is a diagram illustrating an exemplary hardware configuration of a recognition device according to the embodiments and modified examples.

FIG. 9 is a diagram illustrating an example of a hardware configuration of the recognition device according to the embodiments and modified examples. The recognition device according to the embodiments and modified examples described above includes a control device 902 such as a CPU, a storage device 904 such as a ROM and a RAM, an external storage device 906 such as a HDD, a display device 908 such as a display, an input device 910 such as a keyboard and a mouse, and an imaging device 912 such as a digital camera, which is a hardware configuration utilizing a common computer system.

Programs to be executed by the recognition device according to the embodiments and modified examples described above are recorded on a computer readable recording medium such as a CD-ROM, a CD-R, a memory card, a digital versatile disk (DVD) and a flexible disk (FD) in a form of a file that can be installed or executed, and provided therefrom.

Alternatively, the programs to be executed by the recognition device according to the embodiments and modified examples may be stored on a computer system connected to a network such as the Internet, and provided by being downloaded via the network. Still alternatively, the programs to be executed by the recognition device according to the embodiments and modified examples may be provided or distributed through a network such as the Internet. Still alternatively, the programs to be executed by the recognition device according to the embodiments and modified examples may be embedded in a ROM or the like in advance and provided therefrom.

The programs to be executed by the recognition device according to the embodiments and modified examples have modular structures for implementing the components described above on a computer system. In an actual hardware configuration, the CPU reads programs from the HDD and executes the programs on the RAM, whereby the respective components described above are implemented on a computer system.

The present invention is not limited to the embodiments presented above, but may be embodied with various modified components in implementation without departing from the spirit of the invention. Furthermore, the invention can be embodied in various forms by appropriately combining multiple components disclosed in the embodiments. For example, some of the components presented in the embodiments may be omitted. Furthermore, some components in different embodiments may be appropriately combined.

For example, the order in which the steps in the flowcharts in the embodiments described above are performed may be changed, a plurality of steps may be performed at the same time or the order in which the steps are performed may be changed each time the steps are performed.

As described above, according to the embodiments and modified examples, higher recognition accuracy and robustness can be achieved.

What is claimed is:

1. A recognition device comprising:
storage configured to store multiple training patterns each belonging to any one of multiple categories; and
a processor configured to execute a program to implement an acquiring unit, a first calculator, a second calculator, a determining unit, and an output controller, wherein
the acquiring unit is configured to acquire a recognition target pattern to be recognized;
the first calculator is configured to calculate, for each of the categories, a distance histogram representing distribution of the number of training patterns belonging to the category with respect to distances between the recognition target pattern and the training patterns belonging to the category;
the second calculator is configured to obtain a distance that is a mode in each of the categories from the distance histogram of the category, arrange n distances of the distances in ascending order, and add, to each of the n distances, differences between adjacent distances from the shortest distance to the next largest distance after the present distance to calculate confidences of n categories with higher probabilities of being a category of the recognition target pattern out of the multiple categories;
the determining unit is configured to determine the category of the recognition target pattern from the n categories by using any one confidence of the n confidences; and
the output controller is configured to output the category of the recognition target pattern.

2. A recognition device comprising:
storage configured to store multiple training patterns each belonging to any one of multiple categories; and
a processor configured to execute a program to implement an acquiring unit, a first calculator, a second calculator, a third calculator, a determining unit, and an output controller, wherein
the acquiring unit is configured to acquire a recognition target pattern to be recognized;
the first calculator is configured to calculate, for each of the categories, a distance histogram representing distribution of the number of training patterns belonging to the category with respect to distances between the recognition target pattern and the training patterns belonging to the category;

the third calculator is configured to calculate, for each of the categories, a cumulative histogram representing a ratio of a cumulative number obtained by adding up the numbers in the distance histogram according to the distances;
the second calculator is configured to analyze the distance histogram of each of the categories and the cumulative histogram of each of the categories to calculate confidence of the category;
the determining unit is configured to determine a category of the recognition target pattern from the multiple categories by using the confidences; and
the output controller is configured to output the category of the recognition target pattern.

3. The device according to claim 2, wherein
the second calculator is configured to calculate confidences of n categories with higher probabilities of being the category of the recognition target pattern out of the multiple categories, and
the determining unit is configured to determine the category of the recognition target pattern from the n categories by using any one confidence of the n confidences.

4. The device according to claim 3, wherein
the cumulative histogram of each of the categories represents a ratio of the cumulative number obtained by adding up the numbers in the distance histogram of the category in ascending order of the distance to the total number of training patterns belonging to the category according to the distances, and
the second calculator is configured to calculate, for each category, weighted addition of the numbers in the distance histogram in ascending order of the distance up to a distance at which the ratio of the cumulative histogram reaches a threshold to obtain a weighted sum, arrange n of the weighted sums in ascending order of the weighted sum, and add, to each of the n weighted sums, differences between adjacent weighted sums from the smallest weighted sum to the next largest weighted sum after the present weighted sum to calculate the n confidences.

5. The device according to claim 3, wherein the determining unit is configured to determine whether or not a maximum confidence having the largest value of the n confidences exceeds a threshold and, if the maximum confidence exceeds the threshold, determine the category with the maximum confidence to be the category of the recognition target pattern.

6. The device according to claim 3, wherein the determining unit is configured to determine whether or not a given confidence other than a maximum confidence having the largest value of the n confidences exceeds a threshold and, if the given confidence exceeds the threshold, determine the categories with confidences not lower than the given confidence out of the n confidences to be candidates for the category of the recognition target pattern.

7. The device according to claim 6, wherein if the given confidence does not exceed the threshold, the determining unit is configured to determine that the category of the recognition target pattern is not present in the n categories.

8. The device according to claim 2, further comprising:
an image sensor configured to capture an object to be recognized to obtain an image thereof, wherein
the processor is configured to execute the program to further implement an extracting unit;
the extracting unit is configured to extract the recognition target pattern from the image; and
the acquiring unit is configured to acquire the extracted recognition target pattern.

9. A recognition method comprising:
- acquiring, by an acquiring unit, a recognition target pattern to be recognized;
- by a first calculator, acquiring multiple training patterns from storage storing the training patterns each belonging to any one of multiple categories, and calculating, for each of the categories, a distance histogram representing distribution of the number of training patterns belonging to the category with respect to distances between the recognition target pattern and the training patterns belonging to the category;
- by a second calculator, obtaining a distance that is a mode in each of the categories from the distance histogram of the category, arranging n distances of the distances in ascending order, and adding, to each of the n distances, differences between adjacent distances from the shortest distance to the next largest distance after the present distance to calculate confidences of n categories with higher probabilities of being a category of the recognition target pattern out of the multiple categories;
- determining, by a determining unit, the category of the recognition target pattern from the n categories by using any one confidence of the n confidences; and
- outputting, by an output controller, the category of the recognition target pattern.

10. A computer program product comprising a non-transitory computer-readable medium containing a computer program that causes a computer to execute:
- acquiring a recognition target pattern to be recognized;
- acquiring multiple training patterns from storage unit storing the training patterns each belonging to any one of multiple categories, and calculating, for each of the categories, a distance histogram representing distribution of the number of training patterns belonging to the category with respect to distances between the recognition target pattern and the training patterns belonging to the category;
- obtaining a distance that is a mode in each of the categories from the distance histogram of the category, arranging n distances of the distances in ascending order, and adding, to each of the n distances, differences between adjacent distances from the shortest distance to the next largest distance after the present distance to calculate confidences of n categories with higher probabilities of being a category of the recognition target pattern out of the multiple categories;
- determining the category of the recognition target pattern from the n categories by using any one confidence of the n confidences; and
- outputting the category of the recognition target pattern.

11. A recognition method comprising:
- acquiring, by an acquiring unit, a recognition target pattern to be recognized;
- by a first calculator, acquiring multiple training patterns from storage storing the training patterns each belonging to any one of multiple categories, and calculating, for each of the categories, a distance histogram representing distribution of the number of training patterns belonging to the category with respect to distances between the recognition target pattern and the training patterns belonging to the category;
- calculating, by a third calculator, for each of the categories, a cumulative histogram representing a ratio of a cumulative number obtained by adding up the numbers in the distance histogram according to the distances;
- analyzing, by a second calculator, the distance histogram of each of the categories and the cumulative histogram of each of the categories to calculate confidence of the category;
- determining, by a determining unit, a category of the recognition target pattern from the multiple categories by using the confidences; and
- outputting, by an output controller, the category of the recognition target pattern.

12. A computer program product comprising a non-transitory computer-readable medium containing a computer program that causes a computer to execute:
- acquiring a recognition target pattern to be recognized;
- acquiring multiple training patterns from storage storing the training patterns each belonging to any one of multiple categories, and calculating, for each of the categories, a distance histogram representing distribution of the number of training patterns belonging to the category with respect to distances between the recognition target pattern and the training patterns belonging to the category;
- calculating for each of the categories, a cumulative histogram representing a ratio of a cumulative number obtained by adding up the numbers in the distance histogram according to the distances;
- analyzing the distance histogram of each of the categories and the cumulative histogram of each of the categories to calculate confidence of the category;
- determining a category of the recognition target pattern from the multiple categories by using the confidences; and
- outputting the category of the recognition target pattern.

* * * * *